United States Patent
Capon et al.

(10) Patent No.: US 6,963,641 B1
(45) Date of Patent: Nov. 8, 2005

(54) METHOD AND APPARATUS FOR PROVIDING VARIABLE ATTENUATION TO DATA SIGNALS IN AN XDSL FREQUENCY RANGE

(75) Inventors: Michael H. Capon, Austin, TX (US); Robert A. Marshall, Georgetown, TX (US)

(73) Assignee: Cisco Technology, Inc., San Jose, CA (US)

( * ) Notice: Subject to any disclaimer, the term of this patent is extended or adjusted under 35 U.S.C. 154(b) by 802 days.

(21) Appl. No.: 09/741,115

(22) Filed: Dec. 19, 2000
(Under 37 CFR 1.47)

(51) Int. Cl.[7] .......................... H04M 7/04; H04M 9/00
(52) U.S. Cl. ....................................... 379/398; 379/400
(58) Field of Search .......................... 379/398, 399.01, 379/400, 403, 388.03, 388.06, 390.01, 394; 375/222, 224

(56) References Cited

U.S. PATENT DOCUMENTS

| 4,246,582 | A | * | 1/1981 | Kondo et al. ................ 370/282 |
| 4,432,029 | A | * | 2/1984 | Lundqvist ..................... 361/16 |
| 5,479,447 | A |   | 12/1995 | Chow et al. ................. 375/260 |
| 6,226,331 | B1 | * | 5/2001 | Gambuzza ................... 375/258 |
| 6,301,337 | B1 |   | 10/2001 | Scholtz et al. ................ 379/30 |
| 6,330,275 | B1 |   | 12/2001 | Bremer ....................... 375/222 |
| 6,459,790 | B1 |   | 10/2002 | Eckert et al. ............... 389/416 |
| 6,546,090 | B1 |   | 4/2003 | Bremer et al. ........... 379/93.08 |
| 6,658,051 | B1 |   | 12/2003 | Liu ............................ 375/222 |

* cited by examiner

Primary Examiner—Curtis Kuntz
Assistant Examiner—Alexander Jamal
(74) Attorney, Agent, or Firm—Baker Botts L.L.P.

(57) ABSTRACT

An apparatus, system and method for providing variable attenuation to data signals in an xDSL frequency range are disclosed. An attenuation device has a resistive circuit coupled to a capacitive circuit that prevents telephone signals from being attenuated by the resistive circuit and allows normal operation of telephone services at a subscriber premises.

15 Claims, 2 Drawing Sheets

METHOD AND APPARATUS FOR PROVIDING VARIABLE ATTENUATION TO DATA SIGNALS IN AN XDSL FREQUENCY RANGE

TECHNICAL FIELD OF THE INVENTION

This invention relates in general to data communication, and more particularly to a method and apparatus for providing variable attenuation to data signals in an xDSL frequency range.

BACKGROUND OF THE INVENTION

The recent growth of the Internet has increased the demand for additional bandwidth. Digital subscriber line (xDSL) technology meets the demand by providing higher bandwidth data service over existing twisted pair telephone lines. xDSL technology achieves higher data transmission rates by taking advantage of unused frequencies, which are significantly higher than voice band frequencies, on existing twisted pair lines.

xDSL technology, however, is limited because signals cannot be transmitted over long distances without losing signal strength. Due to this limitation, subscribers located closer to the data service provider typically achieve higher data transmission rates than subscribers located further away. Data transmission rates to subscribers located a short distance from the data service provider, however, can also be affected by other conditions, such as noise on the digital signals or intermodulation within the data transmission bands.

SUMMARY OF THE INVENTION

In accordance with the teachings of the present invention, the disadvantages and problems associated with xDSL data transmission have been substantially reduced or eliminated. In particular, an attenuation device is disclosed that provides variable attenuation for data signals in an xDSL frequency range without interfering with telephone services to a subscriber premises.

In accordance with one embodiment of the present invention, an attenuation device includes a resistive circuit that couples to a tip wire and a ring wire of a twisted pair line. A capacitive circuit couples to the resistive circuit. The capacitive circuit permits normal operation of telephone services at a subscriber premises and provides variable attenuation for data signals in an xDSL frequency range.

In accordance with another embodiment of the present invention, an xDSL communications device includes a selector located in a housing and an attenuation device coupled to the selector within the housing. The attenuation device includes a resistive circuit having a first end and a second end. Capacitive circuits couple to the first end of the resistive circuit and permit normal operation of telephone services at a subscriber premises. The capacitive circuits include resistive elements coupled in parallel to capacitive elements. A variable gain amplifier is located in the housing and couples to the selector and the second end of the resistive circuit. The gain of the amplifier is regulated by a gain control circuit, which in turn is controlled by a processor coupled to the gain control circuit. The communications device transmits and receives data signals over a twisted pair line through a line interface coupled to the selector and the capacitive circuits.

In accordance with a further embodiment of the present invention, a method for improving the performance of an xDSL modem includes filtering telephone signals received from a remote location over a twisted pair line. First data signals in a transmit frequency band are received from the xDSL modem and second data signals in a receive frequency band are received from the remote location through capacitive coupling. The first and second data signals are attenuated and the amount of attenuation decreases as frequency increases from the first data signals in the transmit frequency band while the amount of attenuation remains substantially consistent for the second data signals in the receive frequency band.

Important technical advantages of certain embodiments of the present invention include an attenuation device that increases the training rate of an xDSL communications device by providing attenuation for data signals received by or transmitted from an xDSL communications device. Data transmission rates in the xDSL communications device may be reduced because a signal is over-amplified and the xDSL communications device cannot identify the signal due to excessive noise injected on twisted pair telephone lines. Attenuation provided by the attenuation device may eliminate the noise injected on the telephone lines and may allow the xDSL communications device to train at higher data transmission rates.

Another important technical advantage of certain embodiments of the present invention includes an attenuation device that provides a decreasing amount of attenuation as the frequency of a data signal increases in an upstream frequency band. In conventional xDSL systems, injected noise on twisted pair telephone lines distorts lower frequency signals more than higher frequency signals. The attenuation device provides a larger amount of attenuation for the lower frequency signals and thus, reduces or eliminates the injected noise.

An additional important technical advantage of certain embodiments of the present invention includes an attenuation device that, when connected to a premises, allows normal operation of telephone services at the premises. The attenuation device contains capacitive elements that block low frequency telephone signals and prevent them from being attenuated. The attenuation device, therefore, may be added without affecting the integrity of the telephone network at the premises.

A further important technical advantage of certain embodiments of the present invention includes an attenuation device that models different lengths of twisted pair telephone wire. In one embodiment, the attenuation device contains numerous H-pad attenuators that model different lengths of twisted pair wire. The attenuation provides greater flexibility because one attenuation device may be adapted for a range of twisted pair line lengths. Other technical advantages will be readily apparent to one skilled in the art from the following figures, descriptions, and claims.

DETAILED DESCRIPTION OF THE INVENTION

Figure 1:
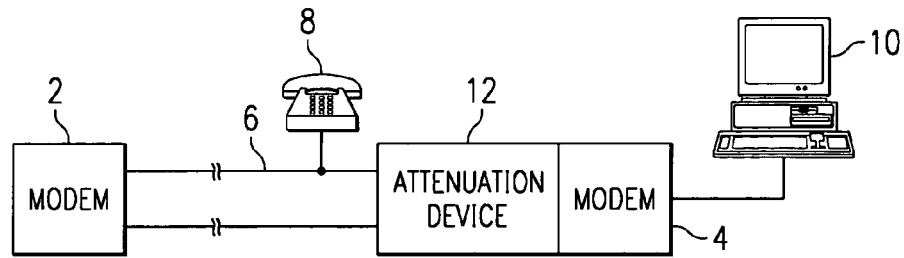
FIG. 1 illustrates one embodiment of an attenuation device in an xDSL communication system according to the teachings of the present invention.

FIG. 1 illustrates an xDSL communication system 1 that transmits data information in the form of signals between two modems 2 and 4. Modem 2 is coupled to modem 4 by a subscriber line 6. Subscriber line 6 supports simultaneous telephone and data service using twisted pair line. Telephone 8 is coupled to subscriber line 6 and computer 10 is coupled to modem 4. Attenuation device 12 is coupled between subscriber line 6 and modem 4.

Subscriber line 6 couples modem 4 to modem 2. Subscriber line 6 comprises twisted pair wiring, which is commonly installed at the subscriber premises and as the local loop in many public switched telephone networks (PSTNs). Subscriber line 6 may be unshielded twisted pair (UTP), shielded twisted pair (STP), or other suitable type or category of twisted pair wiring made of copper or any other suitable conductive material. In a particular embodiment, subscriber line 6 includes tip and ring conductors.

Telephone 8 is a traditional telephone transceiver, a cordless telephone transceiver, or any other device suitable for allowing voice communication over subscriber line 6. In one embodiment, telephone 8 operates with a plain old telephone system (POTS) utilizing a frequency band between $0H_z$ and $4 KH_z$. Telephone 8 may couple to subscriber line 6 using an appropriate passive or active splitter to isolate telephone signals from xDSL signals. Computer 10 is a mainframe device, mini-frame device, server, desktop personal computer, notebook personal computer, or other suitable computing device.

In one embodiment, modem 4 is an external xDSL modem and couples to computer 10. Modem 4 communicates data to and from computer 10 using subscriber line 6. In another embodiment, modem 4 is an internal xDSL modem that is located in computer 10 and communicates data to and from computer 10. Modem 4 couples to other components of computer 10 using a Peripheral Component Interconnect (PCI) bus, an Industrial Standard Architecture (ISA) bus, a Personal Computer Memory Card International Association (PCMCIA) interface, or any other suitable technology that provides input/output capability to computer 10.

Modems 2 and 4 transmit and receive data using any suitable digital subscriber line technology, referred to generally as xDSL. Modems 2 and 4 may support Ethernet, Fast Ethernet, V.35 data protocol, frame relay, asynchronous transfer mode (ATM), switched multi-megabit data service (SMDS), high-level data link control (HDLC), serial line Internet protocol (SLIP), point-to-point protocol (PPP), transmission control protocol/Internet protocol (TCP/IP), or any other appropriate protocol, collectively referred to as digital protocol. In general, modems 2 and 4 translate information between the communication protocol, such as xDSL, and the digital protocol. System 1 contemplates any suitable arrangement of protocol or other communication techniques implemented in hardware and/or software that allows modems 2 and 4 to communicate data using subscriber line 6.

Modems 2 and 4 transmit data information over subscriber line 6 using asymmetric digital subscriber line (ADSL), ADSL lite, rate-adaptive digital subscriber line (R-ADSL), high bit-rate digital subscriber line (HDSL), single-line digital subscriber line (SDSL), very high bit-rate digital subscriber line (VDSL) or any other suitable technology that allows high rate data service over twisted pair wiring. All of these technologies are referred to collectively as xDSL or communication protocol.

xDSL technology provides data service using existing twisted pair wiring without interrupting normal telephone service. This is accomplished by a separation technique, such as frequency division multiplexing (FDM). FDM creates two different bands of frequencies, one for upstream data and the other for downstream data. Both bands may be divided by time division multiplexing (TDM) into one or more high-speed channels and one or more low-speed channels. FDM operates to separate frequencies that provide telephone service from those frequencies that provide data service. Telephone signals typically have frequencies ranging approximately from $0H_z$ to $4 KH_z$ while data signals used for xDSL communication have frequencies ranging from approximately $25 KH_z$ to $1 MH_z$ or higher. Dynamic noise cancellation techniques and a guard band located between the telephone frequency range and the data frequency range ensure reliable and simultaneous access to data and phone service over subscriber line 6. For example, a subscriber at the subscriber premises may simultaneously engage in both a data communication session using computer 10 and a voice conversation using telephone 8.

In one embodiment, modems 2 and 4 support xDSL communication over subscriber line 6 using techniques, such as discrete multitone (DMT) modulation, that comply with ANSI standard T1.413. DMT modulation discretely divides the available frequencies on subscriber line 6 into subchannels or tones. Incoming data signals are broken down into a variety of bits and distributed to a specific combination of subchannels based on the subchannels' ability to carry the transmission. In another embodiment, xDSL communication over subscriber line 6 may be performed using a carrier-less amplitude phase (CAP) modulation technique. CAP modulation generates a modulated wave that carries amplitude and phase state changes by storing parts of a modulated message signal in memory and then reassembling the parts in the modulated wave. In further embodiments, any other suitable modulation technique may be used to support xDSL communication over subscriber line 6.

In an xDSL communication system using ADSL, data received by the end-user, generally referred to as downstream data, is transmitted at a higher rate than data transmitted by the end-user, generally referred to as upstream data. The different transmission rates for upstream and downstream data allow for high bandwidth communication for information being downloaded by the end-user, while still providing lower bandwidth communication for information being uploaded by the end-user. ADSL communication is well adapted for applications, such as video-on-demand, multimedia, and Internet access, which transfer large volumes of information to a modem located at a subscriber premises in response to shorter requests for information to a modem located at a remote location. Typical downstream data transmission rates range approximately from 256 Kbps to 4 Mbps and typical upstream rates are approximately between 128 Kbps to 1.5 Mbps. The maximum data transmission rates are typically achieved at distances of up to approximately 10,000 to 12,000 feet using a standard 24-gauge twisted pair wire. xDSL transmission rates also depend on the specific xDSL technology used, the quality and length of subscriber line 6, and the contribution of noise and distortion from other components throughout the system. Although system 1 has been described in reference to ADSL, any other suitable xDSL communication standard may be used.

In one embodiment, attenuation device 12 couples between modem 4 and subscriber line 6. In alternative embodiments, attenuation device 12 may only be coupled to modem 2 or may be coupled to both modems 2 and 4. Attenuation device 12 filters out telephone signals received from subscriber line 6 and attenuates data signals received from or transmitted to remote modem 2 via subscriber line 6. More specifically, attenuation device 12 includes capacitive circuits that block low frequency telephone signals from passing through resistive sections of attenuation device 12 but allow higher frequency data signals to pass through resistive sections of attenuation device 12.

In normal operation of telephone services at a premises, network equipment coupled to subscriber line 6 can detect two operating states: on-hook and off-hook. In the on-hook state, the tip and ring wires of subscriber line 6 form an open circuit and the resistance detected by network equipment coupled to subscriber line 6 is above a predetermined threshold. In the off-hook state, the tip and ring wires of subscriber line 6 form a closed circuit and the resistance detected by network equipment coupled to subscriber line 6 is below the predetermined threshold. When the on-hook state is detected by the network equipment, the telephone network at a subscriber premises may receive an incoming telephone call from subscriber line 6 and when the off-hook state is detected, the telephone network at the premises cannot receive an incoming call because the network is busy. Without the capacitive circuits, the resistive section of attenuation device 12 would cause the resistance of subscriber line 6 to always be below the predetermined threshold, thus representing an off-hook state. The capacitive circuits, therefore, permit normal operation of telephone services at the subscriber premises by preventing network equipment coupled to subscriber line 6 from detecting an artificial off-hook state at the subscriber premises.

Figure 2:
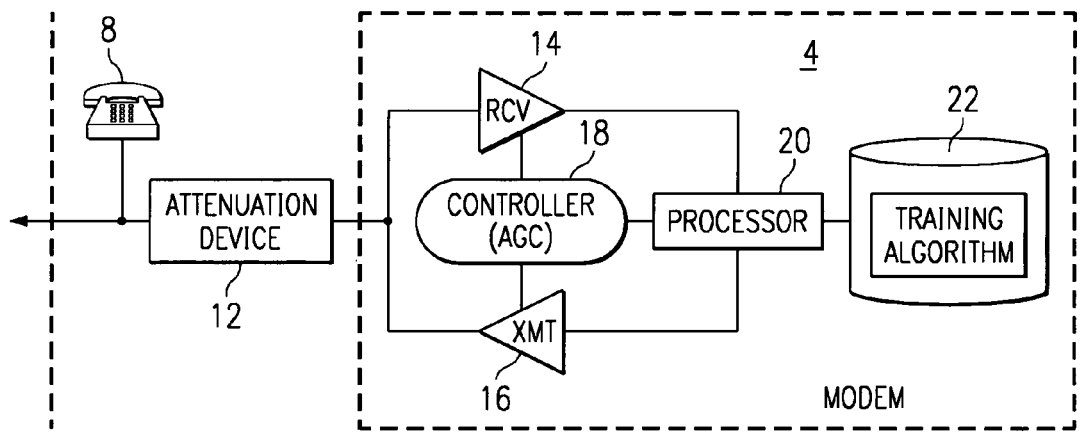
FIG. 2 illustrates in more detail the attenuation device coupled to an xDSL modem.

FIG. 2 illustrates, in more detail, attenuation device 12 coupled to modem 4. Modem 4 comprises a receive amplifier 14, a transmit amplifier 16, an automatic gain control (AGC) system 18, a processor 20, and memory 22 coupled to processor 20. Attenuation device 12 couples between subscriber line 6 and the input of receive amplifier 14 and the output of transmit amplifier 16. As in FIG. 1, telephone 8 couples to subscriber line 6 and provides for voice communication using subscriber line 6.

Figure 3:
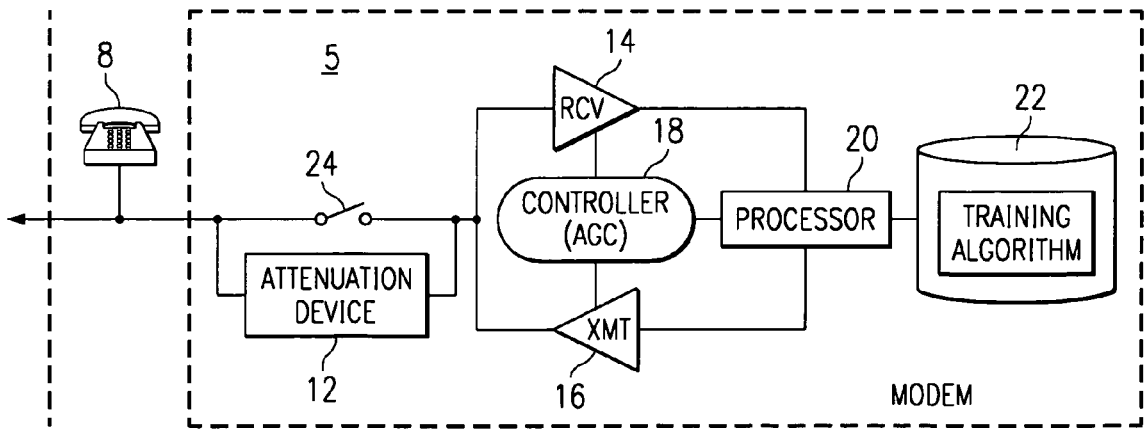
FIG. 3 illustrates in more detail the attenuation device integrated in the xDSL modem.

In FIGS. 2 and 3, processor 20 may be a microprocessor, a microcontroller, a digital signal processor (DSP) or any other digital circuitry configured to process information. Processor 20 may perform data modulation, error recovery, channel separation, echo estimation and cancellation, encoding and decoding operations, training sessions and any other signal processing and communication tasks.

Receive amplifier 14 and transmit amplifier 16 may be variable gain circuits having a variety of components that process data signals for presentation to processor 20. For example, the components forming receive amplifier 14 and transmit amplifier 16 may include components that provide gain in order to bring the data signal to a level that is compatible with processor 20. In one embodiment, receive amplifier 14 and transmit amplifier 16 may comprise a plurality of gain stages. AGC 18 may control all stages of receive amplifier 14 and transmit amplifier 16. In an alternative embodiment, one stage of receive amplifier 14 and transmit amplifier 16 may provide a substantially consistent gain to the transmitted or received data signal. In this particular embodiment, AGC 18 may not control at least one stage of receive amplifier 14 and transmit amplifier 16.

Memory 22, coupled to processor 20, may store data signal profile information such as coefficients used in CAP, DMT, or any other suitable modulation techniques, maximum data transmission rates for upstream and downstream data, margins, and other information that may reflect the physical or electrical properties of subscriber line 6. Margins may represent the difference between a current or expected signal strength and a minimum signal strength needed to maintain communication at the chosen data transmission rate over subscriber line 6.

Memory 22 may also store a training algorithm used by modem 4 to achieve maximum data transmission rates. Processor 20 may execute the training algorithm when a communications channel is being established between modems 2 and 4. By using the training algorithm stored in memory 22, processor 20 may attempt to select the fastest transmission rates for data signals being communicated in the upstream and downstream directions.

Processor 20 directs handshaking operations and negotiates rates for data transmission between modems 2 and 4 when executing the training algorithm stored in memory 22. During a training session, processor 20 attempts to train modem 4 at the highest possible data transmission rates. If the attempt fails because processor 20 cannot recognize the data signal due to excessive noise, processor 20 lowers the data transmission rate until it successfully establishes a connection between modems 2 and 4.

Memory 22 also stores information needed by processor 20 to execute the training algorithm. This information may include the baud rate of modem 4, the signal quality of the received or transmitted data signals, the gains of receive amplifier 14 and transmit amplifier 16, the desired margin, and any other information that characterizes subscriber line 6 and the appropriate communication parameters for modem 4. The baud rate identifies different modulation rates of data signals communicated between modems 2 and 4. The signal quality describes the quality of the signals transmitted between modems 2 and 4, where lower signal qualities typically represent higher-quality connections. The gain of receive amplifier 14 or transmit amplifier 16 identifies the strength of the data signal received or transmitted by modem 4 and how much that signal should be amplified. The desired margin describes the ability of modem 4 to correct errors during data transfers before the errors excessively affect the data transmission rate.

Processor 20 begins a training session of a signal received from modem 2 over subscriber line 6 by determining the quality or characteristics of the received signals. In one embodiment, AGC 18 measures the signal strength of the data signal and communicates the measured signal strength to processor 20. Processor 20 compares the measured signal strength with profile information stored in memory 22 in order to determine if the data signal requires any amplification. If processor 20 determines that the data signal should be amplified, processor 20 calculates the amplification desired and communicates the appropriate information to AGC 18. AGC 18 then adapts the gain of receive amplifier 14 in accordance with the level of the measured signal strength and the calculated amplification provided by processor 20. For example, if the measured signal strength is below a first level, AGC 18 may increase the gain of receive amplifier 14. If the measured signal strength is above the first level but below a second level, AGC 18 may decrease the gain of receive amplifier 14 accordingly. If the measured signal strength is above the second level, AGC 18 eliminates the gain of receive amplifier 14. In one embodiment, AGC 18 controls all stages of amplification in receive amplifier 14 and transmit amplifier 16 and reduces the gain of receive amplifier 14 and transmit amplifier 16 to unity if the measured signal strength is above the second level. In another embodiment, AGC 18 has no control over the final stage of receive amplifier 14 and transmit amplifier 16 and reduces the gain of receive amplifier 14 and transmit amplifier 16 to the value of the substantially consistent gain provided by at least one stage. Although the operation of modem 4 has been described in reference to a data signal received by modem 4, it will be recognized that the same principles apply to signals transmitted by modem 4 to modem 2.

Although AGC 18 may reduce or eliminate the gains of receive amplifier 14 and transmit amplifier 16, data signals received from a data service provider located a short distance, e.g., less than 5,000 feet, from the subscriber premises may have a signal strength above the second level. Data signals having signal strengths above the second level may inject excessive noise into either the upstream or downstream frequency bands. In one embodiment, if a data signal is received from modem 2 at modem 4 and the measured signal strength is above the first level, AGC 18 reduces the gain of receive amplifier 14 in an attempt to eliminate noise. If the noise is not completely eliminated by reducing the gain of receive amplifier 14 and modem 4 cannot identify the data signal, processor 20 causes modem 4 to train at a lower rate until the data signal can be identified. Using amplifiers with more sensitive dynamic ranges may reduce the noise on the data signal so that it can be identified without reducing the data transmission rate. Adding sensitivity to receive amplifier 14 and transmit amplifier 16 in modem 4, however, requires that modem 4 be redesigned with complex and expensive circuitry and is a costly option because the subscriber typically must purchase a new modem.

Attenuation device 12 allows modem 4 to train at higher data transmission rates by filtering out telephone signals and attenuating data signals received and transmitted by modem 2 using subscriber line 6. Although extra attenuation in twisted pair wiring is generally not desirable because data signals are attenuated as they travel through subscriber line 6, some problems associated with xDSL communication systems may be solved by using attenuation device 12. For example, subscribers located short distances from a data service provider location may experience reduced data transmission rates due to excessive noise on received data signals, intermodulation between the upstream and downstream frequency bands, non-linear amplifier operation, or the use of a modem having a insufficient dynamic range. When receive amplifier 14 or transmit amplifier 16 operates in a non-linear mode, the data signals may be clipped so that processor 20 cannot distinguish injected noise from the data signals.

Attenuation device 12 operates to set the dynamic ranges of receive amplifier 14 and transmit amplifier 16 based on the strength of the data signals and therefore, may increase the dynamic ranges of receive amplifier 14 and transmit amplifier 16 in modem 4 for a given length of subscriber line 6. As described previously, attenuation device 12 includes capacitive circuits that operate to filter telephone signals but permit data signals to pass through a resistive section. The resistive section of attenuation device 12 reduces noise on a data signal by reducing the signal strength. Processor 20 may identify the data signal without reducing the data transmission rate because the noise is reduced to a level where the processor may distinguish noise from the data signal. Also, attenuation device 12 is a low cost option because no redesign of either modems 2 or 4 is required. A subscriber at the subscriber premises may install attenuation device 12 between subscriber line 6 and modem 4 without rewiring the subscriber premises or replacing modem 4.

Attenuation device 12 coupled to modem 4 may also improve the performance of the receive amplifier 14 and increase the dynamic range of modem 2. When transmitting a data signal from modem 4 to modem 2, processor 20 may determine that the data signal should be amplified in order to be transmitted through subscriber line 6. In one embodiment, however, modem 2 may be located a short distance from modem 4. At this distance, the data signal may not require the amount of amplification provided by transmit amplifier 16 of modem 4. Modem 2 may receive the over-amplified data signal and may cause modem 4 to train at a lower rate because a receive amplifier in modem 2 may not be able to identify the data signal. Attenuation device 12 may reduce the strength of the data signal and thus, allow modem 2 to identify the data signal without having to reduce the data transmission rate. In order to reduce or eliminate noise in the data signal, xDSL modems require amplifiers with sensitive dynamic ranges. Adding more sensitivity to the dynamic range of receive amplifier 14 and transmit amplifier 16 would require modem 4 to be redesigned. Attenuation device 12 may be retrofit to any xDSL communications system by coupling attenuation device 12 between subscriber line 6 and modem 4. In one embodiment, attenuation device 12 may be located in a housing having two line interfaces. Each interface may be coupled to one end of attenuation device 12. One line interface may be coupled to modem 4 and the other line interface may be coupled to a standard RJ-11 wall-jack located at a premises. The wall-jack operates to couple attenuation device 12 to a telephone network at the premises. The ability to retrofit the attenuation device to any xDSL communications device at any subscriber premises reduces the cost for a subscriber. If the subscriber experiences reduced data transmission rates, the subscriber does not have to purchase another modem 4 with a more sensitive dynamic range. The subscriber may purchase attenuation device 12 and couple it to modem 4. With the addition of attenuation device 12, modem 4 may train at higher data transmission rates and may achieve maximum data transmission rates for a given length of subscriber line 6.

Attenuation device 12 also operates to model a length of subscriber line 6. As will be described in more detail below, attenuation device 12 includes a resistive section that contains more than one resistive element. The values of the resistive elements determine the length of wire modeled by attenuation device 12. Attenuation device 12 may be designed to model different lengths of twisted pair wire and may be added to system 1 to provide attenuation that reduces noise on the data signals. In one embodiment, attenuation device 12 includes a resistive section containing variable resistors. The resistance of each resistor in attenuation device 12 may be changed based on a variety of factors. In another embodiment, attenuation device may include more than one resistive section, where each resistive section represents a different length of subscriber line 6. A hardware and/or software selector, switch, controller, or other selection technique (generally referred to as selector) may control which resistive section is used to attenuate the data signal.

FIG. 3 illustrates attenuation device integrated with the components inside the housing of modem 5. Similar to modem 4 illustrated in FIG. 2, modem 5 comprises receive amplifier 14, transmit amplifier 16, AGC 18, processor 20 and memory 22. Modem 5 also includes attenuation device 12 and selector 24.

Processor 20 may control selector 24 based on the measured signal strength of the data signal. In one embodiment, when modem 5 receives a data signal from modem 2, selector 24 is closed allowing the data signal to bypass attenuation device 12. If modem 5 identifies the data signal, processor 20 keeps selector 24 closed so that the data signal is not attenuated. If modem 5 cannot identify the data signal and the gain of receive amplifier 14 has been reduced to its lowest value, processor 20 opens selector 24. The resistive section in attenuation device 12 attenuates the data signal. In an alternative embodiment, modem 5 contains more than one attenuation device 12 and more than one selector 24 associated with each attenuation device 12. Processor 20 controls selector 24 and selects one of attenuation devices 12 based on the measured signal strength of the data signal. In order to choose the appropriate attenuation device 12, memory 22 may contain a table including multiple signal strengths, the amount of attenuation associated with each signal strength and the length of twisted pair wiring that corresponds to the desired attenuation. After measuring the signal strength of the data signal, processor 20 may access the table stored in memory 22. Processor 20 may compare the measured signal strength with the signal strengths contained in the table. If the data signal should be amplified according to the values in the table, processor 20 may close selectors 24 associated with attenuation devices 12 so that the data signal bypasses the attenuation devices 12. The measured signal strength may then be communicated to AGC 18 so that AGC 18 may cause receive amplifier 14 to provide the desired amount of gain to the data signal. If the data signal does not need amplification and the signal strength has been determined to be above the second level, processor 20 selects the appropriate selector 24 to open so that the data signal passes through attenuation device 12 that is able to provide the required amount of attenuation. Although the operation of selector 24 has been described in reference to a data signal received by modem 5, it will be recognized that the same principles apply to signals transmitted by modem 5 to modem 2. Furthermore, it will be recognized that selector 24 may be implemented in hardware and/or software.

Integrating attenuation device 12 into modem 5 may also provide advantages for the subscriber. Although the subscriber may have to purchase another modem, the cost of the modem may be much less than a modem using complex circuitry to increase the dynamic ranges of receive amplifier 14 and transmit amplifier 16. Furthermore, integrating attenuation device 12 in modem 5 gives modem 5 greater flexibility in choosing when to attenuate the data signal and how much attenuation to provide.

Figure 4:
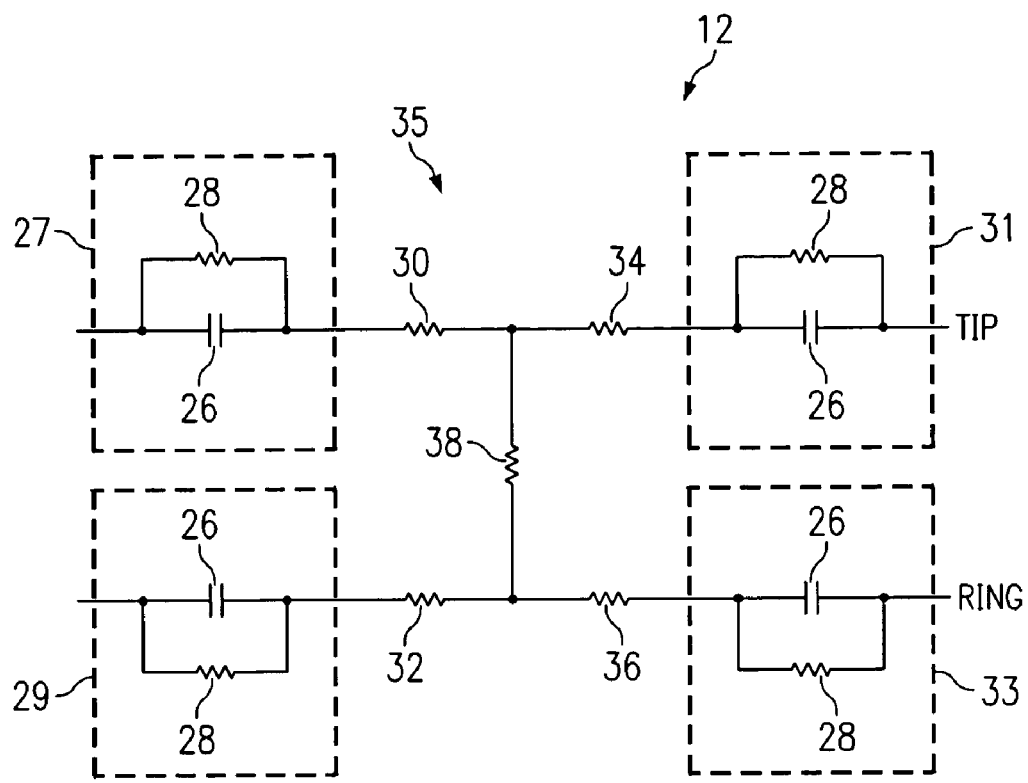
FIG. 4 illustrates a circuit diagram of the attenuation device.

FIG. 4 illustrates a circuit diagram of attenuation device 12. Attenuation device 12 includes capacitive circuits 27, 29, 31 and 33 and resistive section 35. Capacitive circuits 27 and 29 couple to a first end of resistive section 35 and capacitive circuits 31 and 33 couple to a second end of resistive section 35. By coupling capacitive circuits 27, 29, 31 and 33 to both ends of resistive section 35, attenuation device 12 may be interchangeable such that either capacitive circuits 27 and 29 may couple to subscriber line 6 or capacitive circuits 31 and 33 may couple to subscriber line 6. In an alternative embodiment, attenuation device 12 may include capacitive circuits 27 and 29 and resistive section 35. Capacitive circuits 27 and 29 may couple between the first end of resistive section 35 and subscriber line 6. Capacitive circuits 27, 29, 31 and 33 function to block ring voltage from subscriber line 6 and protect resistive section 35 from the ring voltage. In one embodiment, resistive section 35 is an H-pad attenuator. The H-pad attenuator allows bi-directional communication of data signals and provides linear attenuation to data signals received from subscriber line 6 or transmitted by modem 4.

Capacitive circuits 27, 29, 31 and 33 include capacitive elements 26 and resistive elements 28. Capacitive circuits 27 and 31 couple to the tip wire of subscriber line 6 and capacitive circuits 29 and 33 couple to the ring wire of subscriber line 6. Capacitive elements 26 couple to the tip and ring wires and resistive elements 28 couple in parallel to capacitive elements 26. Capacitive elements 26 function to block low frequency telephone signals from passing through resistive section 35 and resistive elements 28 function to protect capacitive elements 26 from any voltage division problems. Resistive section 35 comprises resistive elements 30, 32, 34, 36 and 38. Resistive element 30 couples in series between capacitive circuit 27 and resistive element 34 on the tip wire of subscriber line 6 and resistive element 34 further couples in series to capacitive circuit 31. Resistive element 32 couples in series between capacitive circuit 29 and resistive element 36 on the ring wire of subscriber line 6 and resistive element 36 further couples in series to capacitive circuit 33. Resistive element 38 couples in series to resistive elements 30, 32, 34 and 36 and is located between the tip and ring wires of subscriber line 6. Since resistors 30, 32, 34 and 36 couple to both ends of attenuation device 12, bi-directional communication is possible. For example, attenuation device 12 may attenuate data signals received by modem 4 through subscriber line 6 and may attenuate data signals transmitted from modem 4.

In one embodiment, capacitive elements 26 are 1 $\mu$F capacitors and resistive elements 28 are 1 megaohm resistors. In a particular embodiment, resistive section 35 models 2,000 feet of subscriber line 6 wire. Resistive elements 30, 32, 34 and 36 are 9 ohm resistors and resistive element 38 is a 100 ohm resistor. Resistive element 38 operates to match the impedance of subscriber line 6. At frequencies lower than 25 $KH_z$, capacitive elements 26 block signals from passing through resistive section 35 and thus, from being attenuated. At frequencies higher than 25 $KH_z$, however, capacitive elements 26 allow signals to pass through resistive section 35 and to be attenuated.

Although attenuation device 12 has been described in reference to modem 4, it will be recognized that attenuation device 12 may be coupled to modem 2 and perform the same functions. Further, attenuation device 12 may be coupled to both modems 2 and 4 so that noise on the data signals can be reduced or eliminated at both the source and the destination for the data signals.

Figure 5:
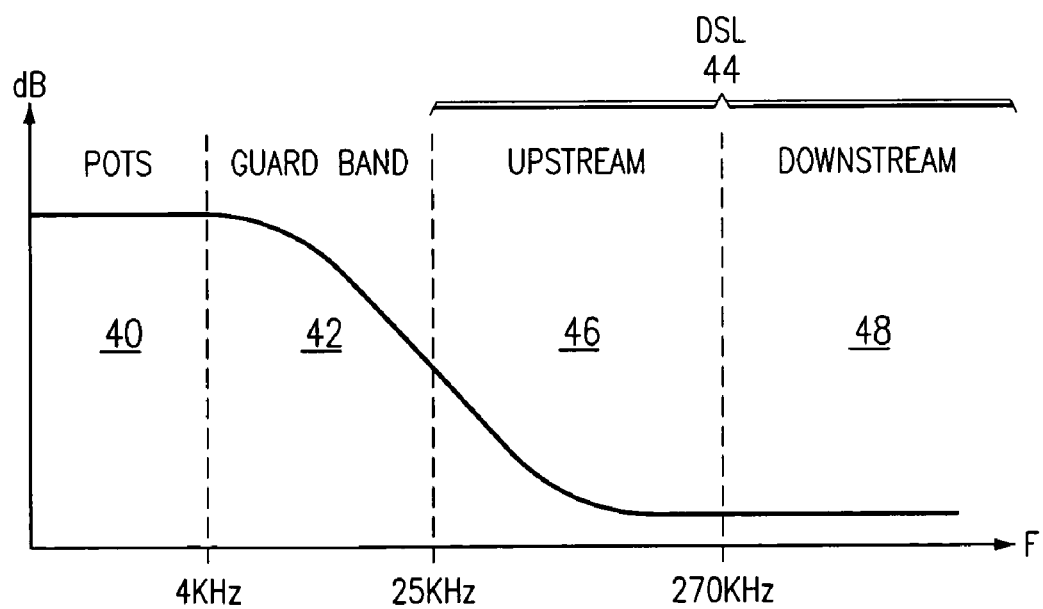
FIG. 5 illustrates a graph of the attenuation provided by the attenuation device over a frequency range.

FIG. 5 shows the amount of attenuation provided by attenuation device 12 to telephone signals in POTS frequency band 40 and to data signals in xDSL frequency band 44. Specifically, the graph is a plot of frequency on the horizontal axis and attenuation on the vertical axis. POTS frequency band 40 generally extends from approximately 0 $H_z$ to approximately 4 $KH_z$ xDSL frequency band 44 is comprised of upstream frequency band 46 and downstream frequency band 48. In one embodiment, signals in upstream frequency band 46 are transmitted from a subscriber to a data service provider and signals in downstream frequency band 48 are received by the subscriber from the data service provider. Upstream frequency band 46 generally extends from approximately 25 $KH_z$ to approximately 270 $KH_z$ and downstream frequency band 48 generally extends from approximately 270 $KH_z$ to approximately 1 $MH_z$ or higher.

The upper boundary of downstream frequency band 48 varies depending on the particular xDSL technology used. A guard band 42 provides some margin of separation between POTS frequency band 40 and upstream frequency band 46, which may provide noise and cross-talk immunity for signals in POTS frequency band 40 and upstream frequency band 46.

As shown in FIGS. 4 and 5, telephone signals in POTS frequency band 40 are blocked from passing through resistive section 35 by capacitive elements 26. Together capacitive elements 26 and resistive elements 28 form a high pass filter, which filters out low frequency telephone signals in POTS frequency band 40 and allows higher frequency data signals in xDSL frequency band 44 to pass through attenuation device 12. As frequencies increase, the amount of attenuation provided by attenuation device 12 decreases. In the upstream frequency band 46, the amount of attenuation decreases as the frequency of the data signal increases. Injected noise on subscriber line 6 may cause lower frequency signals in upstream frequency band 46 to be overamplified. Attenuation device 12 reduces or eliminates the noise by providing a greater amount of attenuation to the lower frequency signals. In the downstream frequency band 48, the amount of attenuation is substantially consistent for all frequencies because injected noise on subscriber line 6 may not distort the higher frequency signals as much as it distorts the lower frequency signals. Although FIG. 5 shows the substantially consistent amount of attenuation as 5 dB, this may be varied by changing the values of resistive elements 30, 32, 34 and 36. If the values of resistive elements 30, 32, 34 and 36 are decreased, the amount of attenuation provided by attenuation device 12 in downstream frequency band 48 decreases and if the values are increased, the amount of attenuation also increases.

Although the present invention has been described in detail, it should be understood that various changes, substitutions, and alterations can be made hereto without departing from the spirit and scope of the invention as defined by the appended claims.

What is claimed is:

1. A digital subscriber line (xDSL) communications device comprising:
    a selector located in a housing;
    an attenuation device located in the housing and coupled to the selector, the attenuation device comprising:
        a resistive circuit having a first end and a second end; and
        a plurality of capacitive circuits coupled in series between the first end of the resistive circuit and the selector, the capacitive circuits comprising a plurality of resistive elements coupled in parallel to a plurality of capacitive elements, the capacitive circuits operable to permit normal operation of telephone services at a subscriber premises;
    a bi-directional variable gain amplifier located in the housing and coupled to the selector and the second end of the resistive circuit;
    a gain control circuit located in the housing and coupled to the amplifier;
    a processor located in the housing and coupled to the gain control circuit and the amplifier;
    a line interface coupled to the selector and the capacitive circuits, the interface operable to communicate over a twisted pair line;
    wherein the processor is operable to
        train the xDSL communications device at a data transmission rate;
        receive a measured signal strength from the gain control circuit of a data signal received from a remote location using the twisted pair line after the xDSL communications device trains;
        calculate an amplification for the data signal based on the measured signal strength; and
        communicate the calculated amplification to the gain control circuit, the gain control circuit operable to adjust the gain of the amplifier; and
    wherein the gain control circuit adjusts the gain of the amplifier by
        increasing the gain of the amplifier if the measured signal strength is below a first value;
        decreasing the gain of the amplifier if the measured signal strength is above the first value and below a second value; and
        eliminating the gain of the amplifier if the measured signal strength is above the second value.

2. The communications device of claim 1, wherein the capacitive circuits are further operable to filter out telephone signals received from a remote location over the twisted pair line.

3. The communications device of claim 1, wherein the capacitive circuits are further operable to:
    filter out telephone signals received from a remote location over the twisted pair line; and
    provide a decreasing amount of attenuation for data signals in a transmit frequency band as frequency of the data signals increases.

4. The communications device of claim 1, wherein the capacitive circuits are further operable to:
    filter out telephone signals received from a remote location over the twisted pair line
    provide a decreasing amount of attenuation for data signals in a transmit frequency band as frequency of the data signals increases; and
    provide a substantially consistent amount of attenuation for data signals in a receive frequency band.

5. The communications device of claim 4, wherein:
    the telephone signals have a frequency approximately below 4 $KH_z$;
    the data signals in the transmit frequency band have a frequency approximately between 25 $KH_z$ and 270 $KH_z$; and
    the data signals in the receive frequency band have a frequency approximately between 270 $KH_z$ and 1 $MH_z$.

6. The communications device of claim 1, wherein the resistive circuit comprises an H-pad attenuator.

7. The communications device of claim 1, wherein the resistive circuit is operable to model a length of twisted pair line between a subscriber premises and a remote location.

8. The communications device of claim 1, further comprising a plurality of attenuation devices coupled to the selector, each device operable to model a different length of twisted pair line between the subscriber premises and the remote location.

9. The communications device of claim 8, wherein the selector is operable to select one of the plurality of attenuation devices.

10. A method for improving the performance of an xDSL modem located at a subscriber premises, the method comprising:
    filtering out telephone signals received from a remote location over a twisted pair line;
    receiving first data signals in a transmit frequency band from the xDSL modem and second data signals in a receive frequency band from the remote location through capacitive coupling;

attenuating the first data signals in the transmit frequency band and the second data signals in the receive frequency band with a resistive circuit, the amount of attenuation decreasing as frequency increases for the first data signals in the transmit frequency band and the amount of attenuation remaining substantially consistent for the second data signals in the receive frequency band;

measuring a strength of one of the first data signals in the transmit frequency band or one of the second data signals in the receive frequency band with a gain control circuit located in the xDSL modem:

calculating an appropriate amount of attenuation based on the measured signal strength with a processor;

adjusting a gain of the transmit or receive amplifiers based on the calculated amplification using the gain control circuit, the step of adjusting the gain of the transmit and receive amplifier based on the calculated amplification comprising:

increasing the gain of the transmit and receive amplifiers if the measured signal strength is below a first level;

decreasing the gain of the transmit and receive amplifiers if the measured signal strength is above the first level and below a second level; and eliminating the gain of the transmit and receive amplifiers if the measured signal strength is above the second level.

11. The method of claim 10, wherein the step of attenuating the first data signals in the transmit frequency band and the second data signals in the receive frequency band with the resistive circuit comprises increasing the effective distance between the xDSL modem and the remote location by modeling a length of twisted pair line.

12. The method of claim 10, wherein:
the telephone signals have a frequency approximately below 4 $KH_z$;
the data signals in the transmit frequency band have a frequency approximately between 25 $KH_z$ and 270 $KH_z$; and
the data signals in the receive frequency band have a frequency approximately between 270 $KH_z$ and 1 $MH_z$.

13. The method of claim 10, wherein the resistive circuit comprises a H-pad attenuator.

14. The method of claim 10, further comprising: attenuating the first data signals in the transmit frequency band and the second data signals in the receive frequency band with one of a plurality of resistive circuits, each of the resistive circuits operable to model a different length of twisted pair line between the subscriber premises and the remote location.

15. The method of claim 10, further comprising:
attenuating the first data signals in the transmit frequency band and the second data signals in the receive frequency band with one of a plurality of resistive circuits, each of the resistive circuits operable to model a different length of twisted pair line between the subscriber premises and the remote location; and
selecting the resistive circuit based on a signal strength of a data signal in the transmit frequency band of a data signal in the receive frequency band, the signal strength measured by a processor located in the xDSL modem.

* * * * *